(12) United States Patent
Oguri et al.

(10) Patent No.: US 9,052,566 B2
(45) Date of Patent: Jun. 9, 2015

(54) OPTICAL SWITCH

(71) Applicant: Furukawa Electric Co., Ltd., Tokyo (JP)

(72) Inventors: Atsushi Oguri, Tokyo (JP); Hiroshi Matsuura, Tokyo (JP); Masayoshi Kimura, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 59 days.

(21) Appl. No.: 13/716,302

(22) Filed: Dec. 17, 2012

(65) Prior Publication Data
US 2013/0108205 A1 May 2, 2013

Related U.S. Application Data

(63) Continuation of application No. PCT/JP2011/072788, filed on Oct. 3, 2011.

(30) Foreign Application Priority Data

Oct. 7, 2010 (JP) .................... 2010-227397

(51) Int. Cl.
*G02B 6/26* (2006.01)
*G02F 1/31* (2006.01)
*G02B 6/35* (2006.01)

(52) U.S. Cl.
CPC ............... *G02F 1/31* (2013.01); *G02B 6/3532* (2013.01); *G02B 6/353* (2013.01); *G02B 6/3542* (2013.01); *G02F 2203/12* (2013.01); *G02B 6/3546* (2013.01)

(58) Field of Classification Search
CPC .. G02B 6/3512; G02B 6/3532; G02B 6/3546; G02B 6/357; G02B 6/3542; G02F 1/31

USPC ............................................. 385/18
See application file for complete search history.

(56) References Cited

U.S. PATENT DOCUMENTS 7,092,599 B2  8/2006  Frisken
7,397,980 B2  7/2008  Frisken
(Continued)

FOREIGN PATENT DOCUMENTS

JP  2006-133336  5/2006
JP  2009-168840  7/2009

OTHER PUBLICATIONS

U.S. Appl. No. 13/871,546, filed Apr. 26, 2013, Matsuura, et al.
(Continued)

*Primary Examiner* — Rhonda Peace
(74) *Attorney, Agent, or Firm* — Oblon, McClelland, Maier & Neustadt, L.L.P.

(57) ABSTRACT

An optical switch includes: an input-output port with three or more ports arranged along a direction; a modulator that includes an incident layer, a reflective layer, and a modulation layer disposed between these layers, spatially modulates light entering the incident layer from any port of the input-output port, and outputs the light spatially-modulated toward any of other ports of the input-output port; and a condensing lens that optically couples the input-output port and the modulator, wherein $x_2 \neq 2x_1 + x_0$ holds where: a coordinate axis is along the direction of the input-output port and an optical axis of the lens is set as an origin of the coordinate axis; $x_0$, $x_1$, and $x_2$ respectively are coordinates of a first port to/from which light is input/output, and a second port and a third port from/to which light input to or output from the first port is output/input; and $x_1, x_2 > 0$.

10 Claims, 7 Drawing Sheets

(56) References Cited

U.S. PATENT DOCUMENTS

| | | | |
|---|---|---|---|
| 7,599,587 B2* | 10/2009 | Nishizawa et al. | 385/18 |
| 7,664,395 B2* | 2/2010 | Holmes | 398/49 |
| 7,676,126 B2* | 3/2010 | McLaughlin et al. | 385/18 |
| 8,126,331 B2* | 2/2012 | Nakajima | 398/94 |
| 8,391,709 B2* | 3/2013 | Colbourne et al. | 398/48 |
| 2006/0067611 A1* | 3/2006 | Frisken et al. | 385/16 |
| 2006/0093258 A1 | 5/2006 | Terahara et al. | |
| 2007/0035803 A1* | 2/2007 | Holmes | 359/279 |
| 2008/0031570 A1* | 2/2008 | Fondeur et al. | 385/18 |
| 2009/0154874 A1* | 6/2009 | McLaughlin et al. | 385/22 |
| 2013/0108205 A1* | 5/2013 | Oguri et al. | 385/10 |

OTHER PUBLICATIONS

International Search Report mailed Dec. 27, 2011, in PCT/JP2011/072788 filed on Oct. 3, 2011 (with English Translation).
International Written Opinion mailed Dec. 27, 2011, in PCT/JP2011/072788 filed on Oct. 3, 2011.

* cited by examiner

OPTICAL SWITCH

CROSS-REFERENCE TO RELATED APPLICATIONS

This application is a continuation of PCT International Application No. PCT/JP2011/072788 filed on Oct. 3, 2011, which claims the benefit of priority from the prior Japanese Patent Application No. 2010-227397 filed on Oct. 7, 2010. The entire contents of these applications are incorporated herein by reference.

BACKGROUND OF THE INVENTION

1. Field of the Disclosure

The disclosure relates to an optical switch.

2. Description of the Related Art

Optical switches are used in optical transmission systems for switching paths of optical signals such as wavelength multiplexing optical signals. Such optical switches use liquid crystal on silicon (LCOS) for switching paths of optical signals (see U.S. Pat. Nos. 7,092,599 and 7,397,980). LCOS is a spatial optical modulator that is able to modulate a phase of incident light by liquid crystal to diffract it. In an optical switch using LCOS, optical switching operation is realized by diffracting an optical signal entering from a certain path by LCOS and outputting it to a specific path.

In the optical switches disclosed in U.S. Pat. Nos. 7,092,599 and 7,397,980, input ports to which optical signals are input and output ports from which optical signals are output are arranged at equal intervals along a certain direction. The input ports are arranged on optical axes of lenses. Therefore, the LCOS is configured to diffract angles of incident light beams in directions of these arrangements. An optical switch having N input ports and M output ports (where N and M are integers of 1 or greater) is called as an N×M optical switch.

SUMMARY

Technical Problem

However, when the inventors carefully examined characteristics of the optical switches configured as disclosed in U.S. Pat. Nos. 7,092,599 and 7,397,980, they have found that these have problems that parts of optical signals may be output to other unintended output ports when optical switching operations to output optical signals input from certain input ports to certain output ports are performed. When a part of an optical signal input to an optical switch is output to an unintended output port like this, a problem occurs that crosstalk characteristics between output ports are deteriorated.

Accordingly, there is a need to provide an optical switch having good crosstalk characteristics.

SUMMARY OF THE INVENTION

According to an embodiment of the present invention, an optical switch includes: an optical input-output port that includes three or more ports to which light is input from outside or from which light is output to the outside, the three or more ports being arranged along a predetermined arrangement direction; a spatial optical modulator that includes a light incident layer, a light reflective layer, and a spatial optical modulation layer disposed between the light incident layer and the light reflective layer, spatially modulates light entering the light incident layer from any port of the optical input-output port, and outputs the light spatially modulated toward any of other ports of the optical input-output port; and a condensing lens that is disposed between the optical input-output port and the spatial optical modulator, and optically couples the optical input-output port and the spatial optical modulator. In this optical switch, $x_2 \neq 2x_1 + x_0$ holds where: a coordinate axis is set along the arrangement direction of the optical input-output port and a position of an optical axis of the condensing lens is set as an origin of the coordinate axis; $x_0$, $x_1$, and $x_2$ respectively are coordinates, in the optical input-output port, of a first port to or from which light is input or output, and a second port and a third port from or to which light input to or output from the first port is output or input; and $x_1$ and $x_2$ are greater than zero.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE INVENTION

Figure 1:
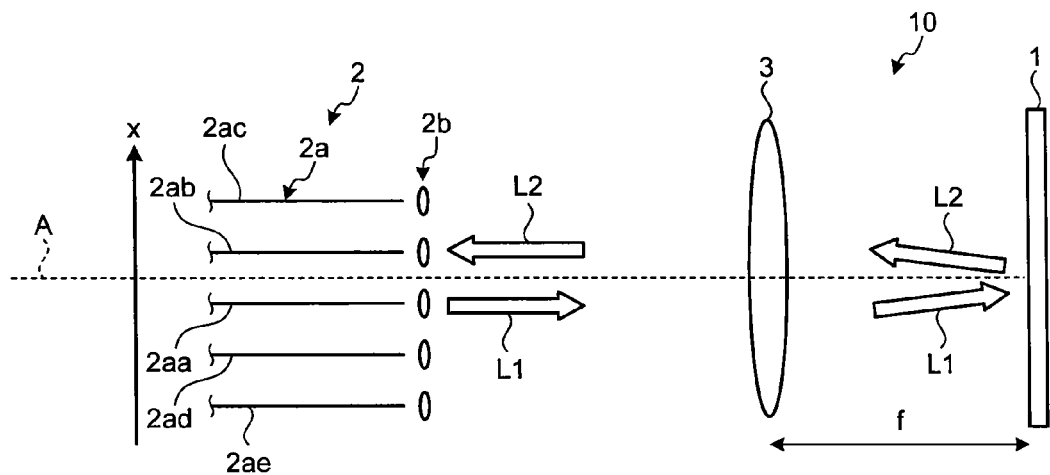
FIG. 1 is a schematic structural view of an optical switch according to a first embodiment.

Embodiments of an optical switch according to the present invention will be described in detail below with reference to the accompanying drawings. The embodiments do not limit the present invention. In the drawings, the same or corresponding components are labeled with the same reference numerals. Further, it is to be noted that the drawings are schematic and relations between thicknesses and widths of each layer and ratios among layers may differ from those of the actual. Furthermore, portions having relations and ratios of dimensions that differ among drawings may be included.

First Embodiment

FIG. 1 is a schematic structural view of an optical switch according to a first embodiment. As illustrated in FIG. 1, an optical switch 10 includes a spatial optical modulator 1, an optical input-output device 2, and a condensing lens 3. Light input to or output from the optical switch 10 is not particularly limited, but may be signal light for optical communications having a wavelength of 1520 to 1620 nm, for example.

The optical input-output device 2 includes an optical input-output port 2a to which light is input from outside or from which light is output to the outside, and a plurality of collimator lenses 2b. The optical input-output port 2a includes optical fiber ports 2aa to 2ae arranged in an array in a predetermined arrangement direction (an x-axis direction in the figure). The collimator lenses 2b are disposed correspondingly to the respective optical fiber ports 2aa to 2ae. Each collimator lens 2b has a function of collimating light output from an optical fiber port or condensing and coupling input collimated light to an optical fiber port. A light beam output from an optical fiber can be approximated as a Gaussian beam. When light output from an optical fiber is collimated by a collimator lens, a beam diameter thereof gradually decreases as it propagates, becomes minimum at a beam waist position, and increases again.

The condensing lens 3, which is disposed between the optical input-output device 2 and the spatial optical modulator 1, optically couples the optical input-output port 2a and the spatial optical modulator 1. The condensing lens 3 has an optical axis A. The condensing lens 3 may be configured of a single lens or a plurality of lenses. The spatial optical modulator 1 is disposed apart from the condensing lens 3 by a distance f, where f is a focal length of the condensing lens 3. That is, the spatial optical modulator 1 is disposed at a focal point of the condensing lens 3. When the condensing lens 3 is disposed apart from the collimator lenses 2b by a distance of d+f, where d is a distance from the collimator lenses 2b to a beam waist position, coupling loss upon re-coupling to the optical fiber 2a is reducible.

In the optical switch 10, of the optical input-output port 2a, the optical fiber port 2aa located at the nearest position to the optical axis A is set as a common optical fiber port (Com port) to which light is input from the outside, and the other four optical fiber ports 2ab to 2ae are set as optical fiber ports to output light to the outside. That is, the optical switch 10 functions as a 1×4 optical switch. In the embodiment, the optical fiber port 2aa is not located on the optical axis A.

Figure 2:
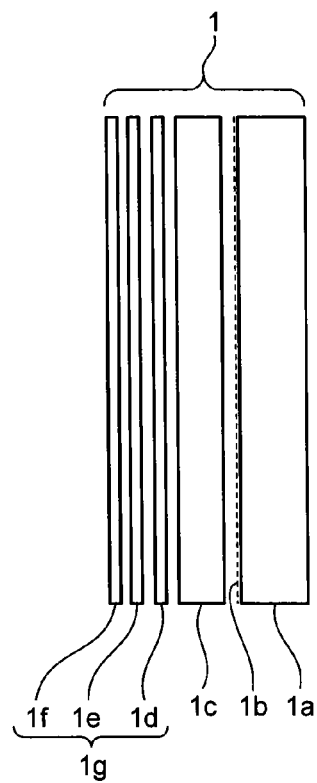
FIG. 2 is an exploded view of a spatial optical modulator illustrated in FIG. 1.

The spatial optical modulator 1 is described below. FIG. 2 is an exploded view of the spatial optical modulator 1 illustrated in FIG. 1. As illustrated in FIG. 2, the spatial optical modulator 1, which is LCOS, has a configuration in which, on a silicon substrate 1a on which a liquid crystal drive circuit is formed, a pixel electrode group 1b, which is a reflective layer having a reflectivity of approximately 100%, a liquid crystal layer 1c, which is a spatial optical modulation layer, an alignment film 1d, an indium tin oxide (ITO) electrode 1e, and a cover glass 1f are sequentially layered. Another alignment film may be provided between the pixel electrode group 1b and the liquid crystal layer 1c as necessary. Hereinafter, the alignment film 1d, the ITO electrode 1e, and the cover glass 1f are referred to as a light incident layer 1g.

The spatial optical modulator 1 is controllable by applying a voltage between the pixel electrode group 1b and the ITO electrode 1e such that the liquid crystal layer 1c has a refractive index gradation in a certain direction. By adjusting the refractive index gradation, light entering from the light incident layer 1g side is adjustable to be diffracted at a certain diffraction angle when reflected by the pixel electrode group 1b and propagating through the liquid crystal layer 1

The spatial optical modulator 1 is disposed such that a direction of the refractive index gradation of the liquid crystal layer 1c coincides with the arrangement direction of the optical fiber ports 2aa to 2ae of the optical input-output port 2a. As a result, the spatial optical modulator 1 is able to control a light emission angle by controlling the voltage applied to the liquid crystal layer 1c such that light entering from the optical fiber port 2aa is able to be output toward any of the other optical fiber ports 2ab to 2ae.

Figure 3:
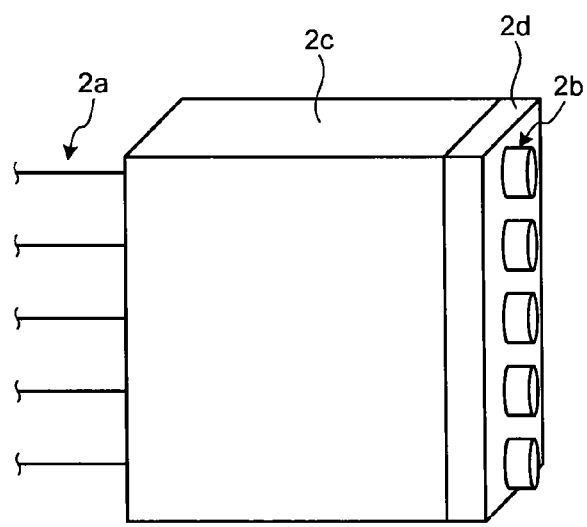
FIG. 3 is a schematic diagram of a specific configuration of an optical input-output device illustrated in FIG. 1.

A specific configuration of the optical input-output device 2 is described below. FIG. 3 is a schematic diagram illustrating the specific configuration of the optical input-output device 2 illustrated in FIG. 1. As illustrated in the configuration of FIG. 3, the optical input-output device 2 includes the optical input-output port 2a, the plurality of collimator lenses 2b, an optical fiber fixing base 2c through which each optical fiber port of the optical input-output port 2a is inserted to be fixed, and a transparent spacer 2d that is attached to the optical fiber fixing base 2c and holds the collimator lenses 2b.

Each optical fiber port is fixed such that a light-emitting end face thereof and the surface of the optical fiber fixing base 2c on which the spacer 2d is attached are on the same plane. The thickness of the spacer 2d is approximately equal to the focal length of each collimator lens 2b. As a result, each collimator lens 2b is able to collimate light output from an optical fiber port, and condense and couple input collimated light to an optical fiber port, in the optical input-output device 2.

OPERATION EXAMPLE 1-1

An operation example 1-1 is described below, in which a path of light input from the optical fiber port 2aa is switched to the optical fiber port 2ab as illustrated in FIG. 1. The optical fiber port 2aa receives light from the outside, and the corresponding collimator lens 2b collimates the input light. The condensing lens 3 condenses light L1, which has been collimated, to the spatial optical modulator 1. The spatial optical modulator 1 spatially modulates and diffracts the light L1, which has been condensed and has entered, by controlling a voltage applied to the liquid crystal layer 1c, and outputs light L2, which has been diffracted, toward the optical fiber port 2ab. The condensing lens 3 collimates the diffracted light L2 with respect to the optical axis A. The collimator lens 2b corresponding to the optical fiber port 2ab condenses the light L2, which has been collimated with respect to the optical axis A, and couples it to the optical fiber port 2ab. The optical fiber port 2ab outputs the coupled light to the outside.

As described, the optical switch 10 switches the path of the light input from the optical fiber port 2aa to the optical fiber port 2ab. Similarly, the optical switch 10 is able to switch the path of light input from the optical fiber port 2aa, which is the Com port, to any of the other optical fiber ports 2ab to 2ae by the control of the spatial optical modulator 1.

When the spatial optical modulator 1 outputs the light L2 diffracted by the spatial optical modulator 1 toward the optical fiber port 2ab, multiple reflection occurs due to internal reflection in the spatial optical modulator 1 and some of the diffracted light L2 is emitted as secondary reflected light. In the optical switch 10 according to the first embodiment however, the following Equation (1) holds, where $x_0$, $x_1$, and $x_2$ are coordinates of the optical fiber ports 2aa, 2ab, and 2ac respectively, where the position of the optical axis A of the condensing lens 3 is the origin of coordinates of the x axis and an upward direction in the figure is its positive direction.

$$x_2 \neq 2x_1 + x_0 \tag{1}$$

Because the optical fiber ports 2*aa*, 2*ab*, and 2*ac* are arranged such that Equation (1) holds, the secondary reflected light does not reach the optical fiber port 2*ac* and thus is prevented from being unintentionally output to the optical fiber port 2*ac*. Consequently, crosstalk characteristics of this optical switch 10 are improved.

Figure 4:
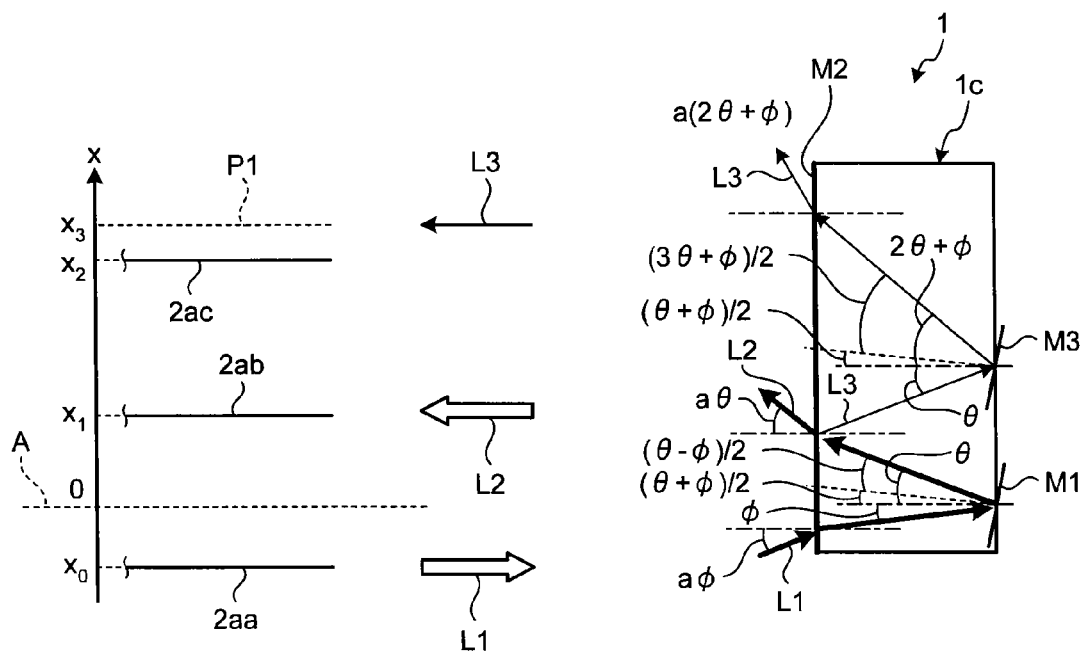
FIG. 4 is a schematic diagram illustrating behavior of light in the spatial optical modulator of the optical switch illustrated in FIG. 1.

A more specific description is given below. FIG. 4 is a schematic diagram illustrating behavior of light in the spatial optical modulator 1 of the optical switch 10 illustrated in FIG. 1. In FIG. 4, the condensing lens 3 is not illustrated. In FIG. 4, the positive direction for angles is the clockwise direction.

In FIG. 4, the light L1, which has been input from the optical fiber port 2*aa*, collimated, and condensed by the condensing lens 3, enters the liquid crystal layer 1*c* of the spatial optical modulator 1. The alternate long and short dash lines in FIG. 4 represent normal lines of the surfaces of the liquid crystal layer 1*c*.

Equation (2) holds when Snell's law is applied to the light L1 on the surfaces of the liquid crystal layer 1*c*.

$$n_1 \sin \theta_1 = n_2 \sin \theta_2 \quad (2)$$

Herein, $n_1$ is a refractive index of an incident side medium, $\theta_1$ is an incident angle of the light L1 with respect to the liquid crystal layer 1*c*, $n_2$ is the refractive index of the liquid crystal layer 1*c*, and $\theta_2$ is a refraction angle of the light L1.

The focal length f of the condensing lens is generally sufficiently longer than the width over which the optical fiber ports 2*aa* to 2*ae* are arranged, and thus the incident angle and the refraction angle are small enough. Therefore, Equation (2) can be approximated as follows.

$$n_1 \theta_1 \approx n_2 \theta_2$$

$$\theta_1 \approx (n_2/n_1)\theta_2 = a\theta_2$$

Hereinafter, $\theta_2$ is replaced with $\phi$. As a result, the incident angle of the light L1 is $a\phi$ and the refraction angle of the light L1 is $\phi$, as illustrated in FIG. 4. The coordinate $x_0$ of the optical fiber port 2*aa*, which is expressed as $x_0 = f \tan(a\phi)$, can be approximated by the following Equation (3) because $a\phi$ is small enough.

$$x_0 = f \tan(a\phi) \approx fa\phi \quad (3)$$

Because $x_0$ is a negative value as illustrated in FIG. 4, $\phi$ is also a negative value.

Then, a pixel electrode M1 of the pixel electrode group 1*b* reflects the light L1 and the liquid crystal layer 1*c* diffracts the light L1 at a diffraction angle $\theta$ with respect to the normal line of the surface of the liquid crystal layer 1*c* by the effect of the refractive index gradation. Although a reflective surface of the pixel electrode M1 actually is disposed to be approximately parallel to the surface of the liquid crystal layer 1*c*, in FIG. 4, the pixel electrode M1 is illustrated as being tilted because the above diffraction is the same as a mirror reflection of the light L1 by the pixel electrode M1 disposed tilted such that the normal line (illustrated by a broken line in the figure) of its reflective surface makes an angle of $(\theta+\phi)/2$ with respect to the normal line of the surface of the liquid crystal layer 1*c*.

When the diffraction angle is $\theta$, the emission angle of the diffracted light L2 with respect to the liquid crystal layer 1*c* is $a\theta$. The diffraction angle $\theta$ is set such that the light L2 is collimated by the condensing lens 3 into light traveling in parallel with the optical axis A, and thereafter enters the optical fiber port 2*ab*. Therefore, the coordinate $x_1$ of the optical fiber port 2*ab* can be approximately expressed by the following Equation (4).

$$x_1 = f \tan(a\theta) \approx fa\theta \quad (4)$$

A reflective surface M2 conceptually represents an internal reflective surface existing in the light incident layer 1*g*. Practically, Snell's law needs to be applied every time refraction occurs at a plurality of surfaces, but this is omitted here for ease of understanding the description. When the diffracted light L2 is emitted from the spatial optical modulator 1, some of the light L2 is reflected by the reflective surface M2 and arrives at a pixel electrode M3 as secondary reflected light L3. The pixel electrode M3 is adjacent to the pixel electrode M1 because the liquid crystal layer 1*c* is generally as thin as a few micrometers. The pixel electrode M3 thus receives the effect of the refractive index gradation of the liquid crystal layer 1*c* similarly to the pixel electrode M1, because the pixel electrode M3 is adjacent to the pixel electrode M1. Therefore, the pixel electrode M3 is in the same state as mirror-reflecting the secondary reflected light L3 in a state of being disposed tilted such that the normal line (illustrated by the broken line in the figure) of the reflective surface thereof makes an angle of $(\theta+\phi)/2$ with respect to the normal line of the surface of the liquid crystal layer 1*c*, similarly to the pixel electrode M1. As a result, the secondary reflected light L3 is diffracted at a diffraction angle of $(2\theta+\phi)$ with respect to the normal line of the surface of the liquid crystal layer 1*c*. Thereafter, the secondary reflected light L3 is emitted from the spatial optical modulator 1 at an emission angle of $a(2\theta+\phi)$.

When a position at which the secondary reflected light L3 arrives, after being collimated by the condensing lens 3 into light traveling in parallel with the optical axis A, is denoted by P1 and the x coordinate of the position P1 is $x_3$, $x_3$ is expressed by the following Equation (5).

$$x_3 = fa(2\theta+\phi) = 2x_1 + x_0 \quad (5)$$

Here, Equations (3) and (4) were used to perform equation modification.

As described, the secondary reflected light L3 generated by the multiple reflection in the spatial optical modulator 1 arrives at the position having the x coordinate expressed by Equation (5).

In the optical switch 10 according to the first embodiment, the optical fiber port 2*ac* is disposed at the coordinate $x_2$ such that Equation (1), which is $x_2 \neq 2x_1 + x_0$, holds, as described above. Therefore, the secondary reflected light L3 does not reach the optical fiber port 2*ac* and is prevented from being output therefrom. Consequently, crosstalk characteristics of this optical switch 10 are improved.

In the above description, the coordinate $x_0$ of the optical fiber port 2*aa* has a negative value, but even if the optical fiber port 2*aa* is disposed such that the coordinate $x_0$ has a positive value, Equations (1) to (5) still hold. Consequently, even if the coordinate $x_0$ has a positive value, crosstalk characteristics of the optical switch 10 are improved. In the first embodiment, however, the optical fiber port 2*aa* is not disposed on the optical axis A of the condensing lens 3, and thus $x_0 \neq 0$.

OPERATION EXAMPLE 1-2

An operation example 1-2 of the optical switch 10 is described below, in which a path of light input from the optical fiber port 2*aa* is switched to the optical fiber port 2*ad*. In the optical switch 10 according to the first embodiment, when coordinates of the optical fiber ports 2*ad* and 2*ae* are $x_1'$ and $x_2'$ in the above x-coordinate system, respectively, the optical fiber ports 2*ad* and 2*ae* are arranged such that $x_2' \neq 2x_1' + x_0$ holds, which is similar to Equation (1). In this case, contrary to the case illustrated in FIG. 4, the diffraction direction by the liquid crystal layer 1*c* is in the negative direction of the x axis, but the secondary reflected light emitted from the spatial optical modulator 1 is prevented from being unintentionally output to the other optical fiber port 2ae in accordance with the same principle as the operation example 1-1. Consequently, crosstalk characteristics of the optical switch 10 are improved.

As described above, in the optical switch 10 according to the first embodiment, the secondary reflected light emitted from the spatial optical modulator 1 is prevented from being output to an unintended optical fiber port and thus its crosstalk characteristics are improved.

In the first embodiment, the optical fiber ports 2aa to 2ae may be disposed at equal intervals or unequal intervals.

Second Embodiment

A second embodiment of the present invention is described below. In an optical switch according to the second embodiment, of its optical input-output port, a Com port inputting light is disposed on an optical axis of a condensing lens.

Figure 5:
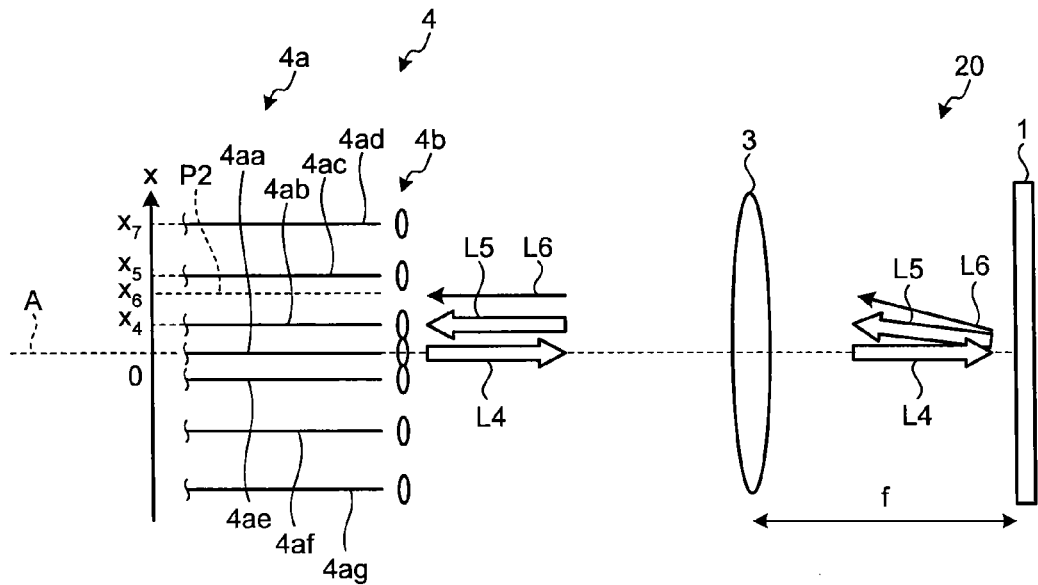
FIG. 5 is a schematic structural view of an optical switch according to a second embodiment.

FIG. 5 is a schematic structural view of the optical switch according to the second embodiment. As illustrated in FIG. 5, an optical switch 20 includes z spatial optical modulator 1, an optical input-output device 4, and a condensing lens 3.

The optical input-output device 4 includes an optical input-output port 4a and a plurality of collimator lenses 4b. The optical input-output port 4a includes optical fiber ports 4aa to 4ag arranged in an array in a certain arrangement direction (an x-axis direction in FIG. 4). The collimator lenses 4b are disposed correspondingly to the respective optical fiber ports 4aa to 4ag. Each collimator lens 4b has a function of collimating light output from an optical fiber port or condensing and coupling input collimated light to an optical fiber port. The specific configuration of the optical input-output device 4 is similar to that illustrated in FIG. 3.

The spatial optical modulator 1 and the condensing lens 3 are the same as those in the first embodiment. Similarly to the first embodiment, the spatial optical modulator 1 is disposed at the focal point of the condensing lens 3. The spatial optical modulator 1 is disposed such that the direction of the refractive index gradation of the liquid crystal layer 1c coincides with the arrangement direction of the optical fiber ports 4aa to 4ag of the optical input-output device 4a.

Of the optical input-output port 4a in the optical switch 20, the optical fiber port 4aa located on the optical axis A is set as the Com port to which light is input from the outside, while the other six optical fiber ports 4ab to 4ag are set as the optical fiber ports to output light to the outside. That is, the optical switch 20 functions as a 1×6 optical switch.

OPERATION EXAMPLE 2

An operation example 2 of this optical switch 20 is described below, in which a path of light input from the optical fiber port 4aa is switched to the optical fiber port 4ab as illustrated in FIG. 5. First, the optical fiber port 4aa receives light from the outside and the corresponding collimator lens 4b collimates the input light. The condensing lens 3 condenses light L4, which has been collimated, to the spatial optical modulator 1. The spatial optical modulator 1 spatially modulates and diffracts the light L4, which has been condensed and input, by controlling voltage applied to the liquid crystal layer 1c, and outputs light L5, which has been diffracted, toward the optical fiber port 4ab. The condensing lens 3 collimates the light L5, which has been diffracted, with respect to the optical axis A. The collimator lens 4b corresponding to the optical fiber port 4ab condenses the light L5, which has been collimated with respect to the optical axis A, and couples it to the optical fiber port 4ab. The optical fiber port 4ab outputs the coupled light to the outside.

As described, the optical switch 20 switches the path of light input from the optical fiber port 4aa to the optical fiber port 4ab. Similarly, the optical switch 20 is able to switch the path of light input from the optical fiber port 4aa, which is the Com port, to any of the other optical fiber ports 4ab to 4ag.

When the spatial optical modulator 1 outputs the diffracted light L4 toward the optical fiber port 4ab, multiple reflection occurs due to the internal reflection in the spatial optical modulator 1 and some of the diffracted light L4 is emitted as secondary reflected light L6. In the optical switch 20 according to the second embodiment, the following Equation (6) holds, where $x_4$ and x5 are coordinates of the optical fiber ports 4ab and 4ac respectively and $x_6$ is a coordinate of a position P2 at which the secondary reflected light L6 arrives, when the position of the optical axis A of the condensing lens 3 is the coordinate origin of the x axis and its positive direction is an upward direction in FIG. 5.

$$x_6 = 2x_4 \qquad (6)$$

The optical fiber ports 4ab and 4ac are disposed such that the following Equation (7) holds.

$$x_5 \neq 2x_4 \qquad (7)$$

Equation (7) corresponds to a case where $x_0=0$ in Equation (1) and where the optical fiber port 4aa, which is the Com port for optical input, is disposed on the optical axis A.

Because Equation (7) holds, the secondary reflected light L6 is prevented from being unintentionally output to the other optical fiber port 4ac. Consequently, crosstalk characteristics of the optical switch 20 are improved.

Figure 6:
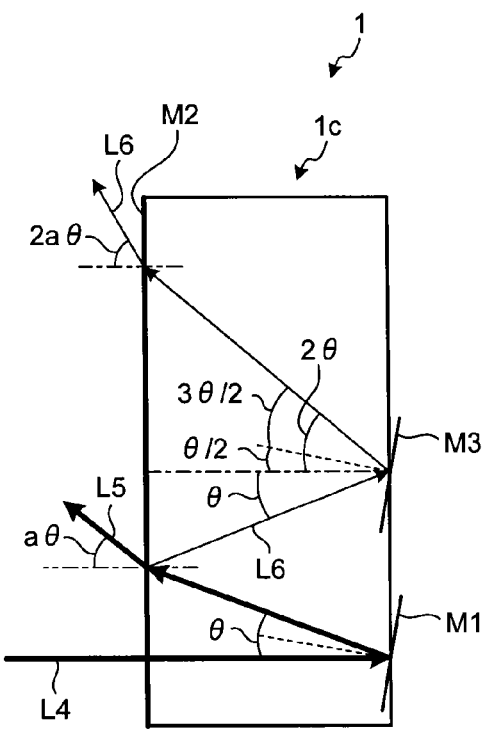
FIG. 6 is a schematic diagram illustrating behavior of light in a spatial optical modulator of the optical switch illustrated in FIG. 5.

A specific description is given below. FIG. 6 is a diagram illustrating behavior of light in the spatial optical modulator 1 of the optical switch 20 illustrated in FIG. 5. In FIG. 6, the condensing lens 3 is not illustrated.

FIG. 6 differs from FIG. 4 in that light L4 input from the optical fiber port 4aa is incident on the liquid crystal layer 1c of the spatial optical modulator 1 at an incident angle of zero. A traveling direction of the light L4 is not diffracted upon passing through the condensing lens 3 because the optical fiber port 4aa is disposed on the optical axis A of the condensing lens 3. As a result, the incident angle is zero.

The pixel electrode M1 reflects the light L4 and the liquid crystal layer 1c diffracts the light L4 at a diffraction angle θ with respect to a normal line of the surface of the liquid crystal layer 1c by the effect of the refractive index gradation.

When the diffraction angle is θ, the emission angle of the diffracted light L5 with respect to the liquid crystal layer 1c is aθ. The diffraction angle θ is set such that the light L4 is collimated by the condensing lens 3 as light traveling in parallel with the optical axis A and thereafter enters the optical fiber port 4ab. Therefore, the coordinate $x_4$ of the optical fiber port 4ab can be approximately expressed by the following Equation (8).

$$x_4 = f \tan(a\theta) = fa\theta \qquad (8)$$

When the light L4 that has been diffracted is emitted from the spatial optical modulator 1, some of the light L4 is reflected by the reflective surface M2 and arrives at the pixel electrode M3 adjacent to the pixel electrode M1 as secondary reflected light L6. The pixel electrode M3 reflects the secondary reflected light L6 and the liquid crystal layer 1c diffracts the light L6 at a diffraction angle (2θ) with respect to a normal line of the surface of the liquid crystal layer 1c by the effect of the refractive index gradation. Thereafter, the secondary reflected light L6 is emitted from the spatial optical modulator 1 at an emission angle of (2aθ).

Therefore, the x coordinate $x_6$ of the position P2 at which the secondary reflected light L6 arrives is expressed as follows.

$$x_6 = fa(2\theta) = 2x_4 \quad (5)$$

Equation (6) is thus obtained.

In the optical switch 20 according to the second embodiment, the optical fiber port 4ac is disposed at the coordinate $x_5$ such that Equation (7) holds, as described above. Therefore, the secondary reflected light L6 does not arrive at the optical fiber port 4ac and is prevented from being output from the optical fiber port 4ac. Consequently, crosstalk characteristics of the optical switch 20 are improved.

Similarly, $x_7 \neq 2x_4$ and $x_7 \neq 2x_5$ hold where $x_7$ is the coordinate of the optical fiber port 4ad. As a result, the secondary reflected light L6 generated in the spatial optical modulator 1 is prevented from being unintentionally output to the optical fiber port 4ad even when the path of light input from the optical fiber port 4aa is switched to any one of the optical fiber port 4ab and the optical fiber port 4ac. In addition, $x_5' \neq 2x_4'$, $x_7' \neq 2x_4'$, and $x_7' \neq 2x_5'$ hold where $x_4'$, $x_5'$, and $x_7'$ are the x coordinates of the optical fiber ports 4ae, 4af, and 4ag, respectively. As a result, the secondary reflected light L6 generated in the spatial optical modulator 1 is prevented from being unintentionally output to the other optical fiber ports 4ae and 4af even when the path of light input from the optical fiber port 4aa is switched to any one of the optical fiber ports 4ae and 4af. Consequently, crosstalk characteristics of the optical switch 20 are improved.

As described above, in the optical switch 20 according to the second embodiment, the secondary reflected light L6 emitted from the spatial optical modulator 1 is prevented from being output to an unintended optical fiber port, and thus its crosstalk characteristics are improved.

In the second embodiment, the optical fiber ports 4aa to 4ae need to be arranged at unequal intervals because Equation (6) may hold when the optical fiber ports 4aa to 4ae are arranged at equal intervals.

As an example of a conventional optical switch, an optical switch was made to have a similar configuration to the optical switch 20 according to the second embodiment but the optical fiber ports were set to be arranged such that the coordinates of the optical fiber ports were $x_4=2.4$ mm, $x_5=4.8$ mm, $x_7=9.6$ mm, $x_4'=-2.4$ mm, $x_5'=-4.8$ mm, and $x_7'=-9.6$ mm, i.e., at equal intervals. In addition, setting was performed such that light having a wavelength of approximately 1552 nm was input from the Com port at $x_0=0$ and output to an optical fiber port having the coordinate $x_4$ by controlling the spatial optical modulator. The crosstalk between the optical fiber port having the coordinate $x_4$ and the optical fiber port having the coordinate $x_5$ was measured.

Figure 7:
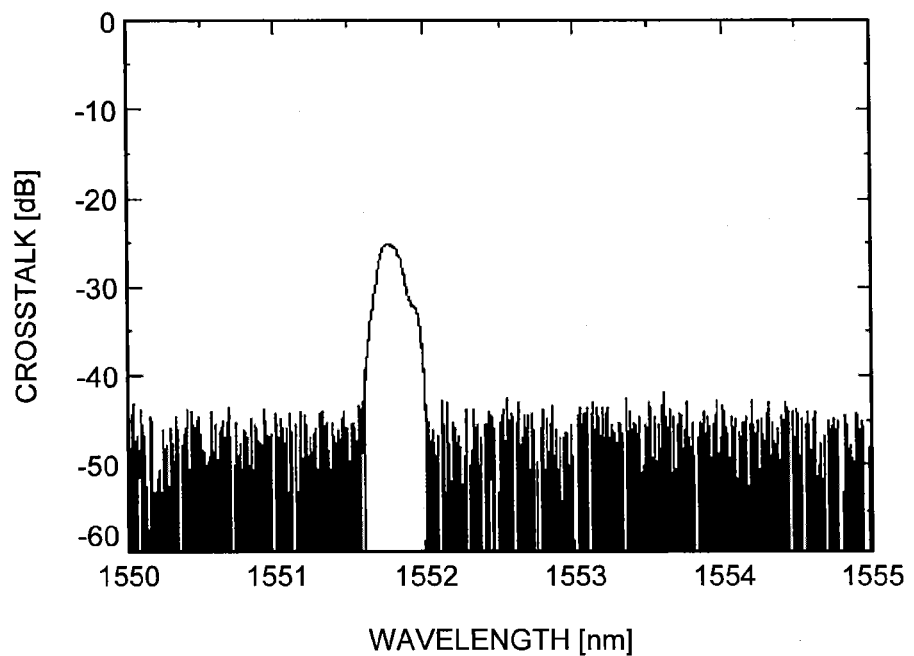
FIG. 7 is a graph illustrating a result of measurement of crosstalk in an optical switch of a conventional example.

FIG. 7 is a graph illustrating a measurement result of the crosstalk in the conventional optical switch. FIG. 7 illustrates optical output from the optical fiber port having the coordinate $x_5$ with optical output from the optical fiber port having the coordinate $x_4$ being a reference (0 dB). According to FIG. 7, reflected light 25 dB lower than the reference is output from the optical fiber port having the coordinate $x_5$. Such a very small crosstalk of 25 db, which is not a problem for use in display, is a problem for optical communications that require strict specifications.

In contrast, in a similar configuration to the optical switch 20 according to the second embodiment, when coordinates of the optical fiber ports are set such that $x_4=2.4$ mm, $x_5=5$ mm, $x_7=11$ mm, $x_4'=-2.4$ mm, $x_5'=-5$ mm, and $x_7'=-11$ mm, and similar measurements to the above are performed, reflected light is hardly output from the optical fiber port having the coordinate $x_5$ and excellent crosstalk characteristics are achievable.

Modified Example of Second Embodiment

In the second embodiment, the optical switch 20 functions as a 1×6 optical switch. As a modified example of the second embodiment, a case in which the optical switch 20 functions as a 6×1 optical switch is described below.

Figure 8:
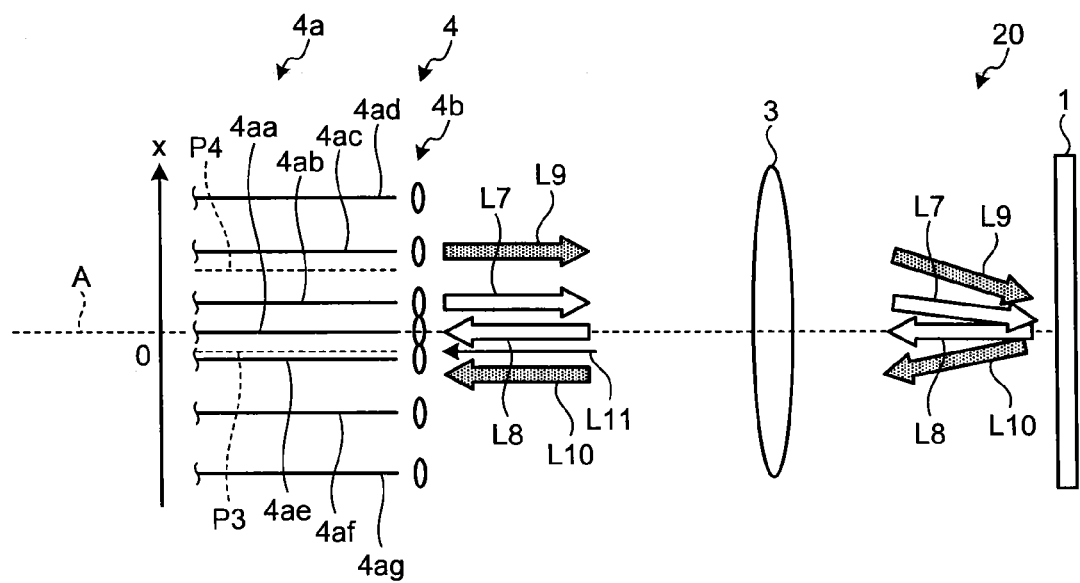
FIG. 8 is a schematic structural view of an optical switch according to a modified example of the second embodiment.

FIG. 8 is a schematic structural view illustrating an optical switch according to the modified example of the second embodiment. The overall configuration of the optical switch 20 illustrated in FIG. 8 is similar to that illustrated in FIG. 5. However, in this modified example, of the optical input-output port 4a, six optical fiber ports 4ab to 4ag are set as optical fiber ports to which light is input from the outside, while the optical fiber port 4aa disposed on the optical axis A is set as the Com port that outputs light to the outside. That is, this optical switch 20 functions as a 6×1 optical switch.

OPERATION EXAMPLE 3

An operation example 3 of the optical switch 20 is described below, in which a path of light input from the optical fiber port 4ab is switched to the optical fiber port 4aa. The optical fiber port 4ab receives light from the outside and the corresponding collimator lens 4b collimates the input light. The condensing lens 3 condenses the collimated light L7 to the spatial optical modulator 1. The spatial optical modulator 1 spatially modulates and diffracts the condensed and entering light L7 by controlling voltage applied to the liquid crystal layer 1c, and outputs diffracted light L8 toward the optical fiber port 4aa. The condensing lens 3 collimates the diffracted light L8 with respect to the optical axis A. The collimator lens 4b corresponding to the optical fiber port 4aa condenses the light L8 collimated with respect to the optical axis A and couples the light L8 to the optical fiber port 4aa. The optical fiber port 4aa outputs the coupled light to the outside.

In this way, the optical switch 20 switches the path of light input from the optical fiber port 4ab to the optical fiber port 4aa. Similarly, the optical switch 20 is able to switch the path of light input from any of the optical fiber ports 4ab to 4ag to the optical fiber port 4aa, which is the Com port.

It is now assumed that light L9 is input from the other optical fiber port 4ac for example, while the optical switch 20 is operating as a 6×1 optical switch as described in the operation example 3. This light L9 normally arrives at the spatial optical modulator 1 via the condensing lens 3, and even if diffracted, the diffracted light L10 will not arrive at and not be output from the optical fiber port 4aa. This is because, in the operation example 3, the diffraction angle of the spatial optical modulator 1 is set such that light input from the optical fiber port 4ab is output to the optical fiber port 4aa.

When the light L9 is input, secondary reflected light L11 is generated from the light L9 due to the internal reflection in the spatial optical modulator 1 and is emitted. In the optical switch 20, however, the optical fiber ports 4ab and 4ac are arranged such that the above Equation (7) holds. As a result, the secondary reflected light L11 arrives at a position P3 as illustrated in FIG. 8, and will not arrive at and not be output from the optical fiber port 4aa. Consequently, the secondary reflected light L11 caused by the light L9 input from the optical fiber port 4ac is prevented from being unintentionally output to the optical fiber port 4aa. Similarly, when the path of light input from any of the optical fiber ports 4ab to 4af is switched to the optical fiber port 4aa, the secondary reflected light L11 generated in the spatial optical modulator 1 is prevented from being unintentionally output to the optical fiber port 4aa.

As described above, crosstalk characteristics of the optical switch 20 according to the modified example are improved even when the optical switch 20 is used as a 6×1 optical switch.

If the optical fiber port 4ac is disposed at a position P4 illustrated in FIG. 8 and the optical fiber ports 4aa, 4ab, and 4ac are arranged at equal intervals, the x coordinate $x_4$ of the optical fiber port 4ab and the x coordinate $x_5$ of the optical fiber port 4ac satisfy the relation of $x_5=2x_4$. In this case, the secondary reflected light enters the optical fiber port 4aa and thus the crosstalk characteristics between the optical fiber ports 4ab and 4ac are degraded.

Figure 9:
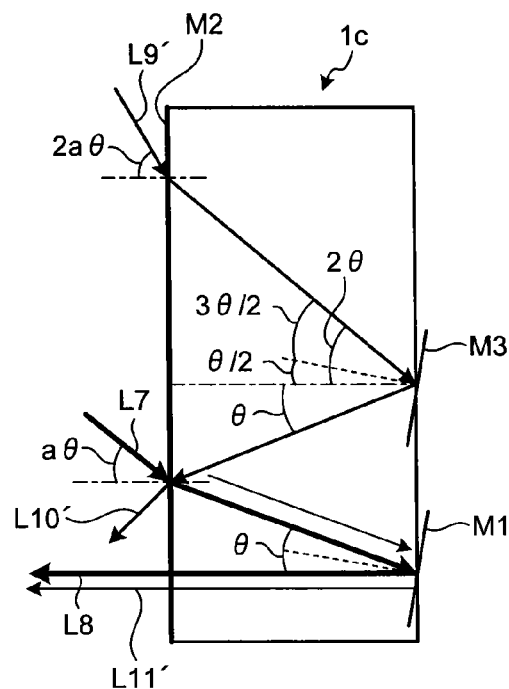
FIG. 9 is a schematic diagram illustrating behavior of light in a spatial optical modulator of an optical switch where optical fiber ports are arranged at equal intervals.

FIG. 9 is a diagram illustrating behavior of light in the spatial optical modulator 1 when the optical fiber ports 4aa, 4ab, and 4ac are arranged at equal intervals.

When FIG. 9 is compared with FIG. 6, the light L7 input from the optical fiber port 4ab passes through a path reverse to those of the light L4 and L5 in FIG. 6, and is emitted as diffracted light L8, and thereafter arrives at the optical fiber port 4aa and is output. If the optical fiber port 4ac is disposed at the position P4 illustrated in FIG. 8, light L9' input from the optical fiber port 4ac passes through a path reverse to that of the secondary reflected light L6 in FIG. 6, and is output as diffracted light L10'. Secondary reflected light L11' of the light L10' is generated by the reflective surface M2. This secondary reflected light L11' passes through a path reverse to that of the light L4 in FIG. 6, and is output in the same direction as the diffracted light L8. Therefore, the secondary reflected light L11' causes degradation of crosstalk characteristics between ports.

Third Embodiment

In the above-described embodiments, the optical input-output ports are configured of optical fibers. An optical input-output port, however, may be configured of an optical waveguide made of a glass material or a semiconductor material. An optical switch including an optical input-output port configured of a planer lightwave circuit (PLC) made of silica based glass is described bellow as a third embodiment of the present invention.

Figure 10:
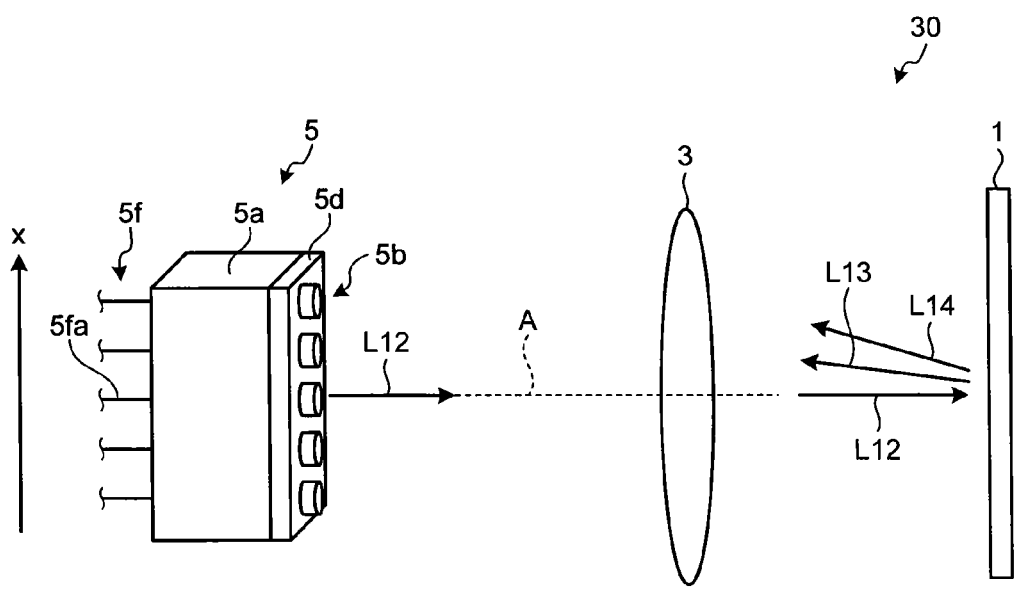
FIG. 10 is a schematic structural view of an optical switch according to a third embodiment.

FIG. 10 is a schematic structural view of an optical switch according to the third embodiment. As illustrated in FIG. 10, an optical switch 30 has a configuration of which the optical input-output device 4 is replaced with an optical input-output device 5 in the configuration of the optical switch 20 illustrated in FIG. 2.

The optical input-output device 5 includes an optical input-output port 5a configured of a PLC made of silica based glass, a plurality of collimator lenses 5b, a spacer 5d that is attached to the optical input-output port 5a and holds the collimator lenses 5b, and an optical fiber array 5f for connecting the optical input-output port 5a and an external path.

The optical input-output port 5a has optical waveguides formed as input or output ports so as to optically connect the optical fiber array 5f and the corresponding collimator lenses 5b. The optical waveguide ports are arranged in the x-axis direction in FIG. 10 in an array similarly to the optical fiber ports 2aa to 2ac and 2ae to 2af of the first embodiment. The x coordinates of the waveguide ports are set similarly to the optical fiber ports 2aa to 2ac and 2ae to 2af.

An example of the operation of the optical switch 30 is described below. The optical waveguide port that is the Com port of the optical input-output port 5a and disposed on the optical axis A of the condensing lens 3 receives light L12 from an optical fiber 5fa of the optical fiber array 5f. Then, the condensing lens 3 condenses the light L12 to the spatial optical modulator 1. The spatial optical modulator 1 diffracts the light L12 and outputs it as light L13 toward a certain optical waveguide port. When this happens, secondary reflected light L14 is generated, but does not arrive at the other optical waveguide ports, similarly to the second embodiment. As a result, crosstalk characteristics of the optical switch 30 are improved.

Fourth Embodiment

A fourth embodiment of the present invention is described below. An optical switch according to the fourth embodiment includes an arrayed waveguide grating (AWG) as a wavelength multiplexer-demultiplexer and functions as a wavelength selecting optical switch.

Figure 11:
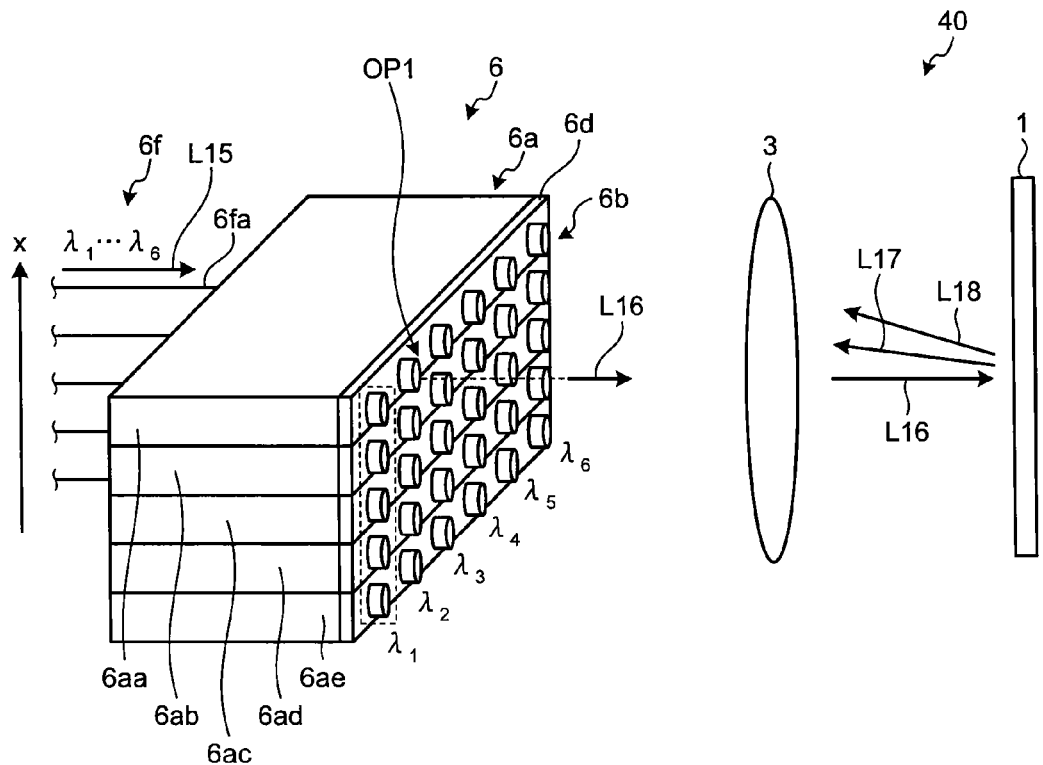
FIG. 11 is a schematic structural view of an optical switch according to a fourth embodiment.

FIG. 11 is a schematic structural view of the optical switch according to the fourth embodiment. As illustrated in FIG. 11, an optical switch 40 has a configuration of which the optical input-output device 2 is replaced with an optical input-output device 6 in the configuration of the optical switch 10 illustrated in FIG. 2. As for the spatial optical modulator, six spatial optical modulators 1 may be used, or a single spatial optical modulator 1 may be divided into six regions and used to independently control each region.

The optical input-output device 6 includes an optical input-output port 6a configured of layered AWGs 6aa to 6ae made of silica based glass, a plurality of collimator lenses 6b, a spacer 6d that is attached to the optical input-output port 6a and holds the collimator lenses 6b, and an optical fiber array 6f for connecting the optical input-output port 6a and an external path.

Each of the AWGs 6aa to 6ae has a function of receiving light beams having wavelengths of $\lambda_1, \lambda_2, \lambda_3, \lambda_4\lambda_5$, and $\lambda_6$ from an input port thereof, and outputs the received light beams from output ports corresponding to the respective wavelengths. The fiber array 6f is connected to the input ports of the AWGs 6aa to 6ae. The collimator lenses 6b are provided correspondingly to the output ports of the AWGs 6aa to 6ae. The output ports of the AWGs 6aa to 6ae are arranged such that output ports for a same wavelength are arranged in an array in the x-axis direction in the figure. The x coordinates of the output ports are set similarly to the optical fiber ports 2aa to 2ac and 2ae to 2af of the optical switch 10 of FIG. 1. For example, in FIG. 11, the output ports of the AWGs 6aa to 6ae for the wavelength $\lambda_1$, which are arranged in an array in the x-axis direction, are illustrated by being surrounded by a broken line. Other optical switches not illustrated are arranged correspondingly to the output ports for the respective wavelengths side-by-side with the spatial optical modulator 1 illustrated in FIG. 11.

An example of the operation of the optical switch 40 is described below. Light L15 including light beams having wavelengths of $\lambda_1, \lambda_2, \lambda_3, \lambda_4, \lambda_5$, and $\lambda_6$ is input from an optical fiber 6fa connected to the AWG 6aa of the optical input-output port 6a. The AWG 6aa outputs light L16 having a wavelength of $\lambda_2$ in the light L15 to an output port OP1 corresponding to the wavelength $\lambda_2$. Next, the condensing lens 3 condenses the light L16 to the spatial optical modulator 1 corresponding to the wavelength $\lambda_2$. The spatial optical modulator 1 diffracts the light L16 and outputs the diffracted light as light L17 toward the output port corresponding to the wavelength $\lambda_2$ of a predetermined one of the AWGs 6ab to 6ae.

When this happens, secondary reflected light L18 is generated in the spatial optical modulator 1. The secondary reflected light L18 however, will not arrive at the other optical waveguide ports similarly to the first embodiment. As a result, crosstalk characteristics of the optical switch 40 are improved. The light beams having the other wavelengths are switched by the spatial optical modulators 1 corresponding to the respective wavelengths to predetermined paths. As a result, the optical switch 40 functions as a wavelength selecting optical switch having good crosstalk characteristics.

In the fourth embodiment, the AWG is used as the wavelength multiplexer-demultiplexer. The wavelength multiplexer-demultiplexer may be configured by combining wavelength selecting elements of a fiber melt type, a filter type, and the like.

Fifth Embodiment

An optical switch according to a fifth embodiment of the present invention is described below. The optical switch according to the fifth embodiment is a wavelength selecting optical switch that selects an optical signal having a certain wavelength from input wavelength multiplexing optical signals and outputs the optical signals by switching paths per wavelength of the optical signal.

Figure 12:
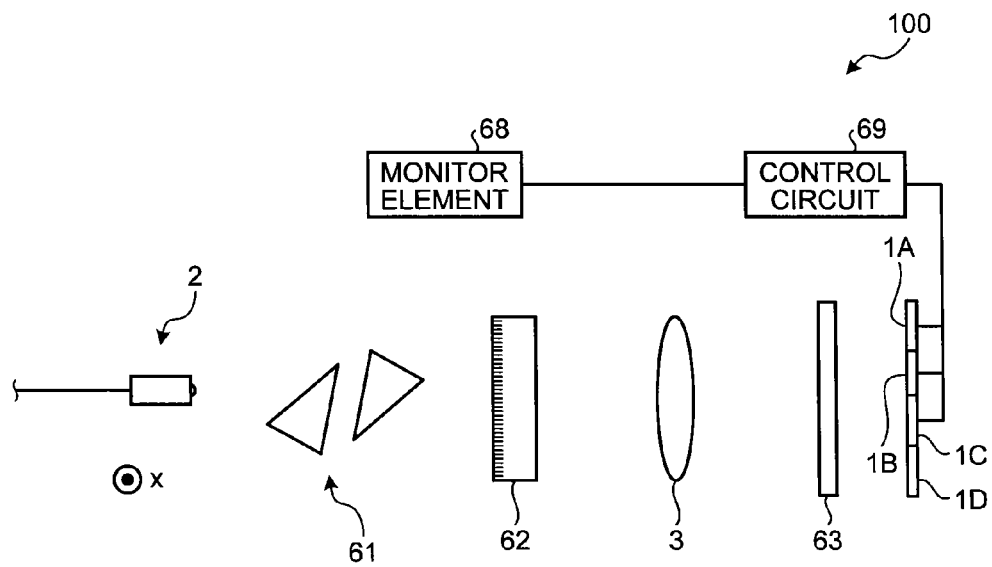
FIG. 12 is a block diagram illustrating a configuration of an optical switch according to a fifth embodiment.

FIG. 12 is a block diagram illustrating a configuration of the optical switch according to the fifth embodiment. As illustrated in FIG. 12, an optical switch 100 includes: the optical input-output device 2 connected to an external path; and an anamorphic prism pair 61, a diffraction grating 62, a condensing lens 3, a quarter-wave plate 63, four spatial optical modulators 1A to 1D arranged in an array in a direction perpendicular to the x axis illustrated in FIG. 12, a monitor element 68 for controlling the spatial optical modulators 1A to 1D, and a control circuit 69, which are sequentially arranged with respect to the optical input-output device 2.

The optical input-output device 2 and the condensing lens 3 are the same as those in the first embodiment. The optical fiber ports of the optical input-output device 2 are arranged at the x coordinates similar to those of the first embodiment, where the position of the condensing lens 3 is set as the origin of the x axis. Each of the spatial optical modulators 1A to 1D is the same as the spatial optical modulator 1 of the first embodiment. The condensing lens 3 and the spatial optical modulators 1A to 1D are disposed apart from each other by the focal length f of the condensing lens 3.

Practically, each component is disposed at an angle because the optical path is bent by the anamorphic prism pair 61 and the diffraction grating 62, but in FIG. 12, the components are illustrated as arranged in series for simplification.

Figure 13:
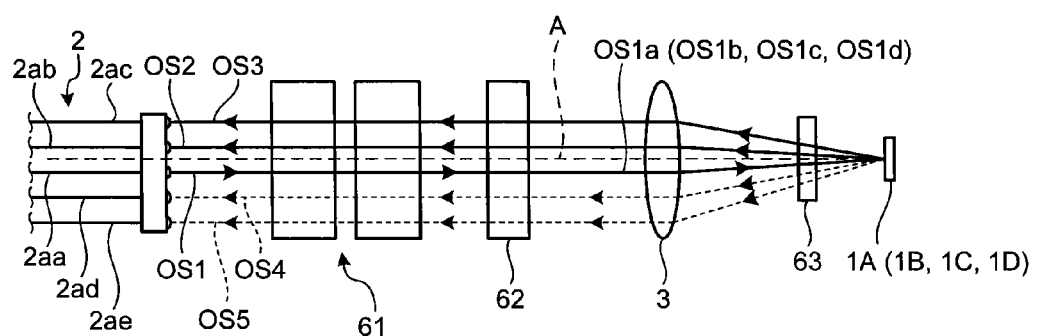
FIG. 13 is a schematic diagram illustrating operations of the optical switch illustrated in FIG. 12.

The operation of the optical switch 100 is described below. FIG. 13 is a schematic diagram illustrating the operation of the optical switch 100 illustrated in FIG. 12. FIG. 13 is a view of the optical switch 100 from a direction perpendicular to the x-axis direction in FIG. 8.

The optical input-output device 2 outputs a wavelength multiplexing optical signal OS1, which is input from a certain path to the optical fiber port 2aa, which is the Com port, to the anamorphic prism pair 61 as collimated light. The anamorphic prism pair 61 expands a beam diameter of the wavelength multiplexing optical signal OS1 in an arrangement direction of grating of the diffraction grating 62 so that the wavelength multiplexing optical signal OS1 hits many grids to increase resolution of wavelength selection. The diffraction grating 62 outputs an optical signal OS1$a$ of a certain wavelength included in the incident wavelength multiplexing optical signal OS1 at a certain angle. The condensing lens 3 condenses the optical signal OS1$a$ to the spatial optical modulator 1A through the quarter-wave plate 63.

The spatial optical modulator 1A diffracts the condensed optical signal OS1$a$ and outputs the diffracted optical signal OS1$a$ as an optical signal OS2 to the desired optical fiber port 2$ab$ of the optical input-output device 2. The optical signal OS2 passes sequentially through the quarter-wave plate 63, the condensing lens 3, the diffraction grating 62, and the anamorphic prism pair 61 and arrives at a desired optical fiber port 2$ab$ of the optical input-output device 2. The quarter-wave plate 63 changes the polarization states of the optical signals OS1$a$ and OS2 such that their polarization states become orthogonal to each other. As a result, polarization dependences of the anamorphic prism pair 61 and the diffraction grating 62 are compensated.

The diffraction grating 62 outputs optical signals OS1$b$, OS1$c$, and OS1$d$ having certain other wavelengths included in the wavelength multiplexing optical signal OS1 at certain other angles, respectively. The optical signals OS1$b$, OS1$c$, and OS1$d$ are diffracted by the spatial optical modulators 1B, 1C, and 1D and output as optical signals OS3, OS4, and OS5, respectively, to the corresponding optical fiber ports 2$ac$, 2$ad$, and 2$ae$ after passing sequentially through the quarter-wave plate 63, the condensing lens 3, the diffraction grating 62, and the anamorphic prism pair 61.

The monitor element 68 monitors the wavelengths and intensities of the light beams partly branched from the optical signals OS2 to OS5, and controls the spatial optical modulators 1A to 1D independently so as to make the diffraction angles of the optical signals OS2 to OS5 optimal based on results of this monitoring. The optical signals OS2 to OS5 may be branched by providing a branching coupler in a part of the optical input-output device 2 or a branching mirror at a proper position in the optical switch 100. The monitor element 68 is configured of the AWG and a plurality of photo diodes, for example.

When the spatial optical modulator 1A diffracts the optical signal OS1$a$, secondary reflected light produced inside the spatial optical modulator 1A is emitted. The secondary reflected light sequentially passes through the quarter-wave plate 63, the condensing lens 3, the diffraction grating 62, and the anamorphic prism pair 61, and arrives at the optical input-output device 2. The secondary reflected light, however, will not arrive at any of the other optical fiber ports 2$ac$ to 2$ae$ due to a similar effect to that in the first embodiment. As for the optical signals OS1$b$, OS1$c$, and OS1$d$, even if secondary reflected light caused by them are generated inside the spatial optical modulators 1B to 1D and is emitted, the secondary reflected light will not reach anything other than the predetermined optical fiber port. Consequently, crosstalk characteristics between ports in the optical switch 100 are improved.

In the above-described embodiments, the 1×4, 1×6, and 6×1 optical switches are described, but in the present invention, the number of optical input-output ports is not particularly limited, and any N×M optical switch is applicable. Either N or M, however, needs to be two or greater. Thus, three or more ports are required. When the wavelength multiplexer-demultiplexer is used like the fourth embodiment, three or more wavelength multiplexer demultiplexers are required.

In the above embodiments, secondary reflected light generated by internal reflection in the spatial optical modulator is prevented from being output to an unintended port. Higher-order reflected light, which has intensity quite weaker than that of the secondary reflected light, is preferably not output to an unintended port. For example, if the coordinates of a first port to which light is input, and second and third ports that output light input from the first port are $x_0$, $x_1$ and $x_2$, respectively, $x_2 \neq 2kx_1 + x_0$ should hold to prevent k-th order reflected light from being output to the third port when switching from the first port to the second port is performed.

Further, for example, in the first and the second embodiments and their modified examples, the Com port of the optical input-output port, to which light is consistently input or from which light is consistently output, is disposed on or near the optical axis of the condensing lens. This is preferable, because light is able to be diffracted by the spatial optical modulator at a small diffraction angle, thereby enabling diffraction efficiency to be increased. The placement of the Com port on the optical axis of the condensing lens is particularly preferable because alignment upon assembly of the optical switch becomes easier, and the incident angle or emission angle of light in the spatial optical modulator is able to be made zero, thereby making control of the spatial optical modulator easier. The present invention, however, is not limited to this, and the port located farthest from the optical axis in the optical input-output port may be set as the Com port.

In the above embodiments, the spatial optical modulation layer is of liquid crystal, but as long us a member that is able to spatially modulate light is used, the spatial optical modulation layer is not particularly limited thereto.

Further, in the above embodiments, the spatial optical modulator is of a reflective type, but this may be of a transmissive type. In that case, reflectivity of the reflective layer is not approximately 100%, and the reflective layer has a certain level of transparency. The present invention is applicable to such a spatial optical modulator of the transmissive type because internal multiple reflection can occur between layers interposing the spatial optical modulator.

Further, the above embodiments do not limit the present invention. Configurations obtained by combining any elements of these embodiments as appropriate are also included in the present invention. For example, the optical input-output device of the second embodiment may be applied to the optical switch according to the fifth embodiment.

According to an embodiment of the disclosure, because reflected light generated by multiple reflection in a spatial optical modulator is prevented from being coupled to an unintended output port, there is an effect that an optical switch having good crosstalk characteristics is realized.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. An optical switch, comprising:
    an optical input-output port that includes three or more ports to which light is input from outside or from which light is output to the outside, the three or more ports being arranged along a predetermined arrangement direction;
    a spatial optical modulator, that includes a light incident layer, a light reflective layer, and a spatial optical modulation layer disposed between the light incident layer and the light reflective layer, spatially modulates light entering the light incident layer from any port of the optical input-output port, and outputs the light spatially modulated toward any of other ports of the optical input-output port;
    a light dispersion element, that is disposed between the optical input-output port and the spatial optical modulator, disperses the light input from the optical input-output port in a direction orthogonal to the predetermined arrangement direction; and
    a condensing lens, that is disposed between the optical input-output port and the spatial optical modulator, optically couples the optical input-output port and the spatial optical modulator, wherein
    $x_2 \neq 2x_1 + x_0$ holds where:
    a coordinate axis is set along the predetermined arrangement direction of the optical input-output port and a position of an optical axis of the condensing lens is set as an origin of the coordinate axis;
    $x_0, x_1,$ and $x_2$ respectively are coordinates, in the optical input-output port, of a first port to or from which light is input or output, and a second port and a third port from or to which light input to or output from the first port is output or input; and
    $x_1$ and $x_2$ are greater than zero.

2. The optical switch according to claim 1, wherein the coordinate $x_0$ of the first port is a value other than zero, and intervals between adjacent ports in the optical input-output port are equal or unequal.

3. The optical switch according to claim 1, wherein the first port receives light to be output to the other ports of the optical input-output port.

4. The optical switch according to claim 1, wherein the first port outputs light input from the other ports of the optical input-output port.

5. The optical switch according to claim 1, wherein the spatial optical modulator is a liquid crystal on silicon (LCOS).

6. The optical switch according to claim 1, wherein the light dispersion element that is disposed between the optical input-output port and the spatial optical modulator functions as a wavelength selecting optical switch.

7. The optical switch according to claim 1, wherein a secondary reflected light produced from the light input from the optical input-output port by multiple reflections inside the spatial optical modulator is prevented from being coupled to the optical input-output port.

8. An optical switch, comprising:
    an optical input-output port that includes three or more ports to which light is input from outside or from which light is output to the outside, the three or more ports being arranged along a predetermined arrangement direction;
    a spatial optical modulator, that includes a light incident layer, a light reflective layer, and a spatial optical modulation layer disposed between the light incident layer and the light reflective layer, spatially modulates light entering the light incident layer from any port of the optical input-output port, and outputs the light spatially modulated toward any of other ports of the optical input-output port; and
    a condensing lens, that is disposed between the optical input-output port and the spatial optical modulator, optically couples the optical input-output port and the spatial optical modulator, wherein
    $x_2 \neq 2x_1 + x_0$ holds where:
    a coordinate axis is set along the predetermined arrangement direction of the optical input-output port and a position of an optical axis of the condensing lens is set as an origin of the coordinate axis;
    $x_0, x_1,$ and $x_2$ respectively are coordinates, in the optical input-output port, of a first port to or from which light is input or output, and a second port and a third port from or to which light input to or output from the first port is output or input; and
    $x_1$ and $x_2$ are greater than zero, and
    the coordinate $x_0$ of the first port is zero, and intervals between adjacent ports in the optical input-output port are unequal.

9. An optical switch, comprising:

an optical input-output port that includes three or more ports to which light is input from outside or from which light is output to the outside, the three or more ports being arranged along a predetermined arrangement direction;

a spatial optical modulator, that includes a light incident layer, a light reflective layer, and a spatial optical modulation layer disposed between the light incident layer and the light reflective layer, spatially modulates light entering the light incident layer from any port of the optical input-output port, and outputs the light spatially modulated toward any of other ports of the optical input-output port; and a condensing lens, that is disposed between the optical input-output port and the spatial optical modulator, optically couples the optical input-output port and the spatial optical modulator, wherein i $x_2 \neq 2x_1 + x_0$ holds where:

a coordinate axis is set along the predetermined arrangement direction of the optical input-output port and a position of an optical axis of the condensing lens is set as an origin of the coordinate axis;

$x_0$, $x_1$, and $x_2$ respectively are coordinates, in the optical input-output port, of a first port to or from which light is input or output, and a second port and a third port from or to which light input to or output from the first port is output or input; and $x_1$ and $x_2$ are greater than zero, and the optical input-output port includes three or more wavelength multiplexer-demultiplexers, and each port that outputs a same wavelength in each of the three or more wavelength multiplexer-demultiplexer forms ports arranged in the predetermined arrangement direction and functions as a wavelength selecting optical switch.

10. The optical switch according to claim 9, wherein each of the three or more wavelength multiplexer-demultiplexers is an arrayed waveguide grating.

* * * * *